United States Patent [19]

Bertin et al.

[11] 4,421,191

[45] Dec. 20, 1983

[54] POWER ASSISTED STEERING DEVICE FOR A VEHICLE

[75] Inventors: Patrice Bertin, Paris; Claude Ledamoisel, Asnieres, both of France

[73] Assignee: VALEO Societe Anonyme, Paris, France

[21] Appl. No.: 304,633

[22] Filed: Sep. 22, 1981

[30] Foreign Application Priority Data

Sep. 30, 1980 [FR] France ............................. 80 20892
Feb. 20, 1981 [FR] France ............................. 81 03371

[51] Int. Cl.³ ..................... B62D 5/06; F16K 11/02
[52] U.S. Cl. ........................ 180/132; 74/388 PS; 91/375 A; 137/625.21; 180/148
[58] Field of Search ............. 180/132, 134, 137–139, 180/148, 146, 147, 79; 74/388 PS; 403/277; 91/375 R, 375 A, 467; 137/625.21

[56] References Cited

U.S. PATENT DOCUMENTS

| | | | |
|---|---|---|---|
| 3,227,178 | 1/1966 | Elwell | 137/625.21 |
| 4,214,642 | 7/1980 | Dauvergne | 180/132 |
| 4,217,932 | 8/1980 | Bacardit | 137/625.21 |
| 4,252,207 | 2/1981 | Dauvergne | 180/148 |
| 4,254,691 | 3/1981 | Dauvergne | 180/148 X |
| 4,300,594 | 11/1981 | Bacardit | 137/625.21 |
| 4,310,024 | 1/1982 | Bacardit | 137/625.21 |
| 4,320,780 | 3/1982 | Bacardit | 137/625.21 |
| 4,325,447 | 4/1982 | Dauvergne | 180/132 |

FOREIGN PATENT DOCUMENTS

| | | | |
|---|---|---|---|
| 4212 | 9/1979 | European Pat. Off. | 180/148 |
| 8252 | 2/1980 | European Pat. Off. | |
| 1369856 | 9/1963 | France | |
| 2380175 | 9/1978 | France | |
| 2486897 | 1/1982 | France | 180/132 |
| 1308890 | 3/1973 | United Kingdom | |
| 2082130 | 3/1982 | United Kingdom | 180/132 |

Primary Examiner—Joseph F. Peters, Jr.
Assistant Examiner—Mitchell J. Hill
Attorney, Agent, or Firm—Young & Thompson

[57] ABSTRACT

A power-assisted steering device for a vehicle comprises a two-part steering column, which parts are capable of limited relative angular displacement, and a hydraulic power-assistance mechanism having a distributor responsive to relative angular displacement of the parts and comprising two rotors, each rotationally integral with a corresponding part of the steering column. One or both of the steering column parts has a prism-shaped cavity in its end, a prism-shaped plug being received in the cavity with an angular offset and being connected to the other part, thus providing the limited angular play between the two parts. The plug may either be a separate element received in cavities in both parts of the steering column, or may be received in a cavity of only one part and integrally formed with the other part. A thin corrugated tooth annular element may act as a rotational lock between each part and the corresponding rotor of the distributor. Alternatively, the rotor is received directly on a prismatic outer surface of the corresponding part, or on the plug, when the plug is rotationally fast with the part.

12 Claims, 15 Drawing Figures

POWER ASSISTED STEERING DEVICE FOR A VEHICLE

BACKGROUND OF THE INVENTION

The present invention relates to a power-assisted steering device for a vehicle, comprising control means operable to act on steering means, said control means comprising a transmission element in two parts, which parts are capable of limited relative angular displacement under the action of said control means, and power-assistance means which, in response to such angular displacment, act on the steering means in the same direction as the control means. These power-assistance means can comprise, in particular, a hydraulic unit, an actuator acting on the steering means and a distributor located between the unit and the actuator and having, for example, two rotors respectively rotating integrally with said two parts of the transmission element.

The relative angular play between the two parts of the transmission element is limited, by suitable stop means, to predetermined value, for example approximately 6°, which corresponds to 3° on either side of a mean position of rest which is restored elastically, for example, by a torsion bar located between said parts. During normal operation, the stop means are not involved and as soon as the relative angular displacement between the parts begins under the action of the control means, the power-assistance means operate and actuate the steering means. If the power-assistance means should fail, the stop means become involved and enable the two parts of the transmission element to move together at the same angle in the desired direction, thus enabling the control means to take over manually to ensure stanby steering under direct control.

In the arrangements proposed hitherto, the stop means generally consist of a member which surrounds the two parts of the transmission element. This member which can, moreover, consist of one of the two rotors of the distributor is engaged with a certain play on the outer splines of one of the parts of the transmission element and without play or with a different play on outer splines of the other transmission element.

It has also been proposed that the stop means should consist of one end of one of the parts of the transmission element which is splined on the inside and which is engaged with play on outer splines of the other part of the transmission element.

In other words, the stop means act peripherally on the outside of at least one of the two parts of the transmission element. These know arrangements certainly have the advantage of high efficiency because of the considerable diameter along which the stop means act, but, on the other hand, they have the disadvantage of increasing the bulk of the assembly, notably in a radial direction. Furthermore, bearing in mind the little space which is available, they do not make it possible to choose freely the coupling means to make the rotors rotate integrally respectively with the two parts of the transmission element.

The object of the present invention is a power-assisted steering device for a vehicle of the type described above, in which these disadvantages are at least minimised and the bulk of which device is reduced, yet the device having at the same time, an excellent efficiency, the device also containing an advantageous embodiment of the means for coupling the rotors to the two parts of the transmission element.

SUMMARY OF THE INVENTION

According to one feature of the invention, a power-assisted steering device for a vehicle is characterised in that at least one of the two parts of the transmission element has, at its end adjacent to the other part, a prism-shaped cavity in which is engaged a prism-shaped plug which is connected to the other part and which has an angular offset in said cavity so as to define the limited relative angular displacement of which said parts are capable.

By means of this arrangement, the space surrounding said two parts become available and can therefore be used easily to house the means for coupling the rotors to said two parts. Morover, the prism-shaped plug can be made as long as desired, so as to ensure transmission of the torque, thus permitting excellent efficiency.

It will be understood that, because of the profile of the plug, the stop contact is provided by means of interfaces of considerable extent.

According to another feature of the invention, a power-assisted steering device for a vehicle is characterised in that at least one of the two parts of the transmission element is notched on the outside and the associated rotor is notched on the inside, whilst a thin annular element, toothed both externally and internally, is located between said part and said rotor, being fitted by means of its teeth in the notches of said part and of said rotor so as to make them rotate integrally with one another. The thin toothed annular element is preferably corrugated.

By means of this arrangement, particularly when the rotors are discs, each rotor is coupled to the corresponding part of the transmission element with highly accurate centering and excellent circumferential integration and, at the same time, with a flexibility permitting a slight axial and/or swivelling movement enabling the production tolerances to be compensated for this leading to an excellent operation of the distributor.

It will be understood that the thin toothed annular element is adapted to be mounted on the end of the associated part and on the associated rotor so as to form a preformed sub-assembly before the plug is fitted into the device. Considerable ease in production results from this.

In one embodiment, the two parts of the rotating transmission element are centred relative to one another by means of rounded edges of the plug. These rounded edges are formed by cylinder arcs which are centred on the axis of the plug and which are tangential to the inside wall of the cavity.

The precision of manufacture of the plug and of the cavity certainly makes it possible to define correctly the limited relative angular play between the two parts of the rotating transmission element, in order to enable, in particular, a manual override, if the power-assistance were to fail. However, it appeared to the inventors that precision of manufacture does not make it possible, in a convenient way, to centre with high accuracy the two parts of the rotating transmission element relative to one another.

Alternatively, the two parts of the rotating transmission element are centered relative to one another by means of two continuous cylindrical bearings which are provided respectively on said parts in the vicinity of the plug.

As a result of this arrangement, the machining of the various parts of the device can easily be accurate enough to ensure that the plug correctly defines the limited relative angular play between the two parts of the rotating transmission element for the purpose of a manual override in the case of failure of the power-assistance, and, furthermore, the centering of the two parts of the transmission element is ensured, in a convenient way, by the continuous cylindrical bearings of the two parts of the rotating transmission element.

In a preferred embodiment, the part which is connected to the plug has a cylindrical centering bearing located beyond the plug in the direction going towards the end of said part, and, preferably, at the very end of this part Thus, this part is convenient to produce, since it has a cross-section which decreases progressively up to its end.

Alternatively, the part which is connected to the plug has this plug beyond the cylindrical centering bearing in the direction going towards the end of said part.

According to another feature of the present invention, a power-assisted steering device for a vehicle is characterised in that one of the parts which has the cavity possesses around the cavity a collar of substantially constant thickness, with a prism-shaped outer profile which is similar to that of the cavity and on which the corresponding rotor is engaged so as to rotate integrally therewith and so as to move freely in translation.

By means of this arrangement, the mounting of the rotor on this part is ensured without any intermediate piece, thus reducing, in particular, the radial bulk.

The prism-shaped collar can conveniently be formed from a cylindrical tube which is flattened on several sides by radially acting forming operations. It is also possible to envisage production by means of an axial action which provides a sort of extrusion. In fact, the prism-shaped collar can be made by employing radially axially acting operations, with sufficient precision to permit excellent rotation of the rotor integrally with the collar and, likewise, a sufficient precision of the inner cavity to provide the limited relative angular play between the two shafts.

According to another characteristic, the part which is connected to the plug receives the corresponding rotor engaged directly on this plug so as to rotate integrally therewith and so as to move freely in translation.

Alternatively, the rotor is engaged on a prism-shaped surface made on this part connected to the plug, adjacent said plug.

DETAILED DESCRIPTION OF THE PREFERRED EMBODIMENTS

In the embodiment illustrated in FIGS. 1 to 6, a power-assisted steering device according to the invention is applied, by way of example only, to a motor vehicle. This device comprises (FIG. 1) control means 10 acting upon steering means such as track rods 11. The control means 10 comprise a steering-wheel 12 and a steering column 13. The latter comprises two axially aligned parts 13A and 13B which are coupled to one another, and capable of limited relative angular displacement therebetween, under the action of the control means 10. The part 13A is rotationally integral with the steering-wheel 12, whilst the part 13B is rotationally integral with a pinion 14 which engages a steering rack 15. The latter controls the orientation of the front wheels 16 of the vehicle through the track rods 11.

Figure 1:
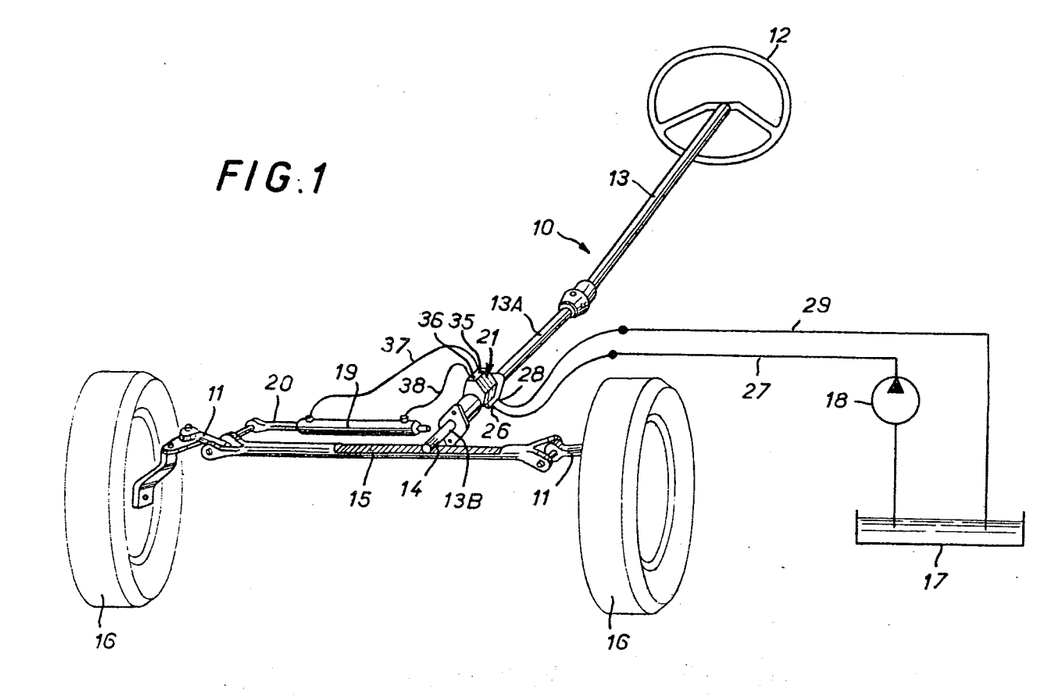
FIG. 1 is a diagrammatic view, in perspective, of a power-assisted steering device according to the invention.

A hydraulic power-assistance unit 17, 18 comprises a tank 17 and a pump 18 drawing from this tank 17. An actuator comprises a hydraulic jack 19 having a piston, the piston rod 20 of which acts on the rack 15.

A hydraulic distributor 21 is located between the pump 18 and the jack 19 and is sensitive to the angular offset of the two parts 13A and 13B so as to cause the jack 19 to act on the track rods 11 in the same direction as the control means 10.

Figure 2:
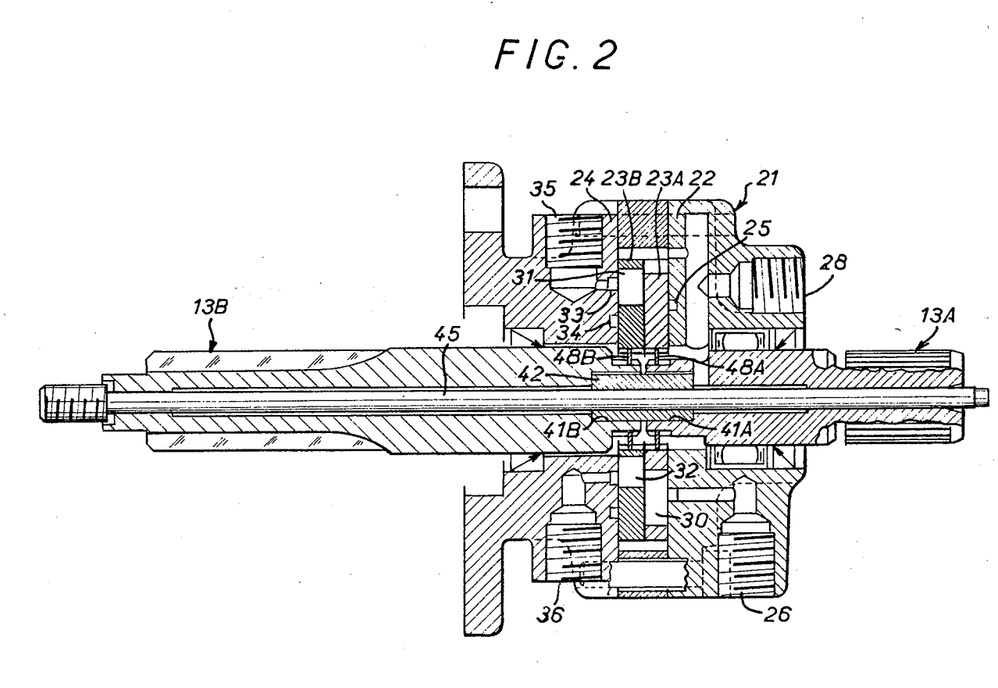
FIG. 2 is a view of a part of this device on a larger scale and in a longitudinal section.
Figures 3, 4:
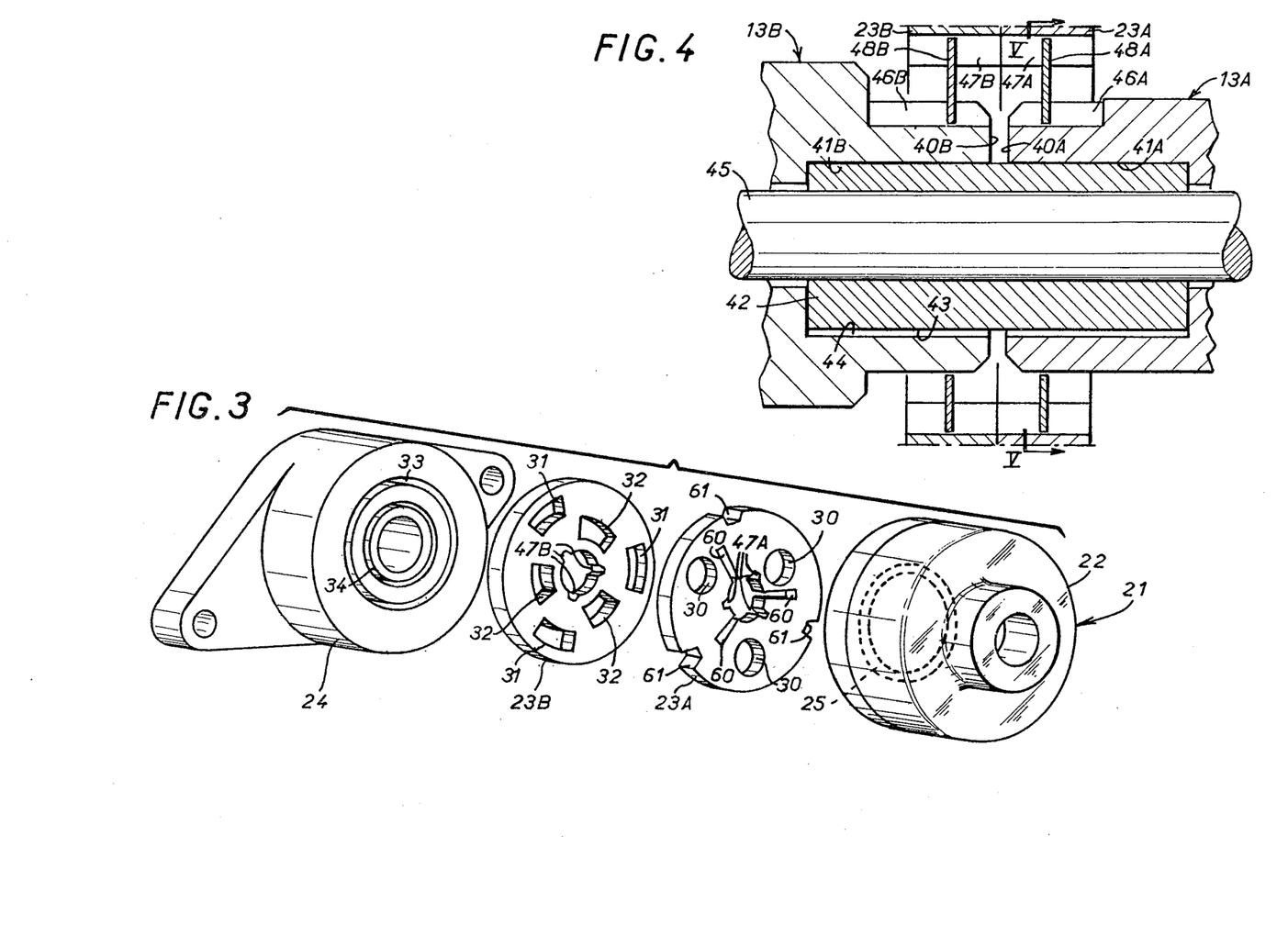
FIG. 3 is an exploded diagrammatic view, in perspective, of the device showing the distributor with two rotors.
FIG. 4 is a view, on an even larger scale, of a detail of FIG. 2, in a longitudinal section along the broken line IV—IV of FIG. 5.

In the example illustrated in FIGS. 2 and 3, the distributor 21 comprises an axially aligned stack composed of a first stator 22, a first rotor consisting of a disc 23A rotating integrally with the part 13A of the steering column, a second rotor consisting of a disc 23B rotating integrally with the part 13B of the steering column, and a second stator 24.

The first stator 22 has a feed groove 25 which is connected to a pressure orifice 26 connected, in turn, by a pipe 27 (FIG. 1) to the pump 18. The first stator 22 also has a return orifice 28 connected by a pipe 29 to the tank 17.

The rotor disc 23A possesses (FIG. 3) a circular series of communication passages 30 and two series of passages 60 and 61 for return of fluid pressure to the tank 17, and the rotor disc 23B possesses two concentric circular series of communication passages 31 and 32, whilst the second stator 24 possesses two concentric annular grooves 33 and 34 which are connected respectively to orifices 35 and 36 (FIG. 2). The orifices 35 and 36 are service orifices connected respectively by pipes 37 and 38 (FIG. 1) to the two sides of the jack 19.

According to the relative angular position of the two rotors 23A and 23B, one or other of the following operating conditions prevails:

the pressure orifice 26 communicates via the passages 30,31,32 with the service orifices 35 and 36 connected, in turn, to the orifices 60,61 for return to the tank 17, this corresponding to the neutral position of rest, and, in this case, the power-assistance is not involved;

the pressure orifice 26 communicates via the passages 30 and 31 with the service orifice 35, which involves the power-assistance on the jack 19 in one direction;

the pressure orifice 26 communicates via the passages 30 and 32 with the other service orifice 36, which involves the power-assistance on the jack 19 in the other direction.

The two parts 13A and 13B of the steering column (FIGS. 4 to 6) have respectively two ends 40A and 40B which are adjacent to one another.

Ends 40A and 40B of the parts 13A and 13B have respectively (FIGS. 4 to 6) opposite prism-shaped cavities 41A and 41B in which is engaged in prism-shaped plug 42, which is a separate element and has a total angular offset 2D (FIG. 5) which may be provided all in one cavity but which preferably is distributed between the two cavities, so as to define the relative angular displacement, which is then equal to 4D, which is possible between the parts 13A and 13B.

The cavities 41A, 41B of each part 13A, 13B and the plug 42 (FIGS. 5 and 6) have a substantially triangular cross-section. More particularly, the faces 43 of the plug 42 (FIGS. 5 and 6) are slightly convex, for example in the form of very open dihedra, the edges of which are seen at 62, whilst the faces 44 of the inside wall of each cavity 41A, 41B are plane, so as to define the total angular deflection 2D. The plug 42 is slipped onto a torsion bar 45 so as to be free to rotate thereabout, the bar 45 being fastened to the two parts 13A and 13B to couple them elastically.

Figure 5:
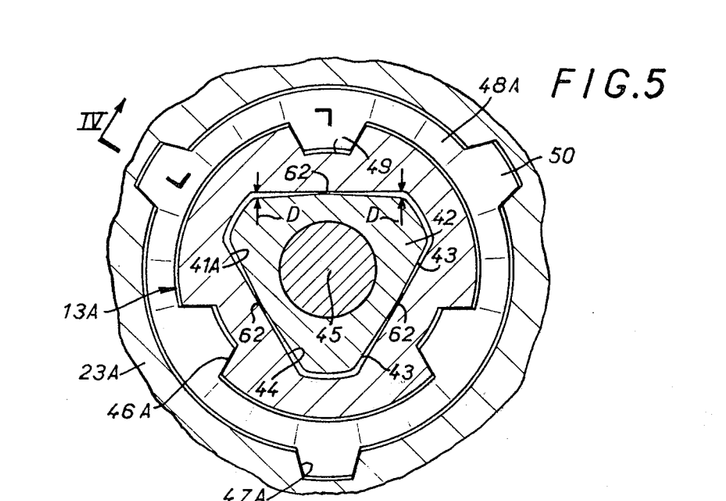
FIG. 5 is a view, of the same detail as FIG. 4, in a cross-section along the line V—V of FIG. 4.

The total angular offsets between the faces 43 of the plug 42 and the cavities 41A and 41B defines the limited relative angular displacement 2D mentioned above. This displacement is a few degrees on either side of the mean neutral position of rest which tends to be restored and maintained by the torsion bar 45.

Figure 6:
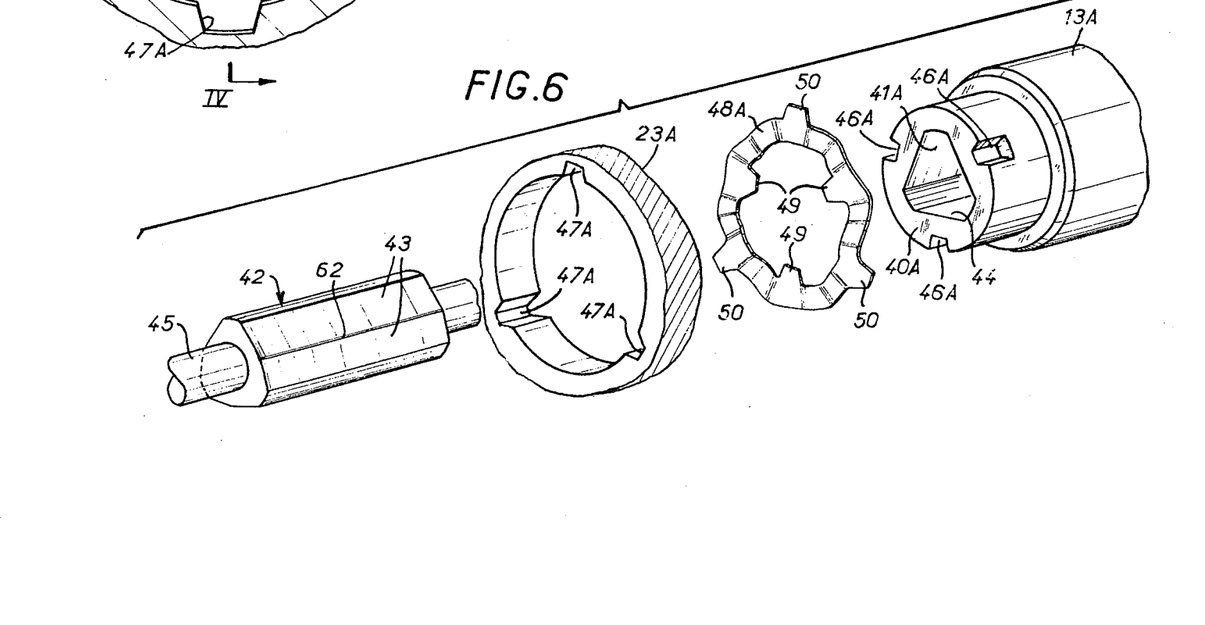
FIG. 6 is an exploded perspective view of part of the device according to the invention.

Each part 13A and 13B is notched on the outside at 46A, 46B. Each rotor disc 23A, 23B is notched on the inside at 47A, 48B. A thin corrugated annular element 48A, 48B toothed both internally at 49 and externally at 50 is located between the part 13A, 13B and the rotor disc 23A, 23B being fitted by means of its teeth 49 into the notches 46A, 46B of the part 13A, 13B and by means of its teeth 50 into the notches 47A, 17B of the rotor disc 23A, 23B so that the rotor disc 23A, 23B is splined on the part 13A, 13B and hence they rotate integrally with one another.

Because of its teeth 49 and 50, the annular element 48A, 48B permits highly accurate centering and excellent circumferential integration of each rotor disc 23A, 23B relative to the corresponding part 13A, 13B and, at the same time, because of its corrugated shape, permits a flexibility allowing a slight axial and/or swivelling movement which compensates for the production tolerances, and this leads to excellent operation of the distributor.

The thin toothed annular element 48A, 48B is designed to be mounted on the end 40A, 49B of the associated part 13A, 13B, so as to form a prefitted subassembly 13A-48A-23A, 13B-48B-23B, before the plug 42 is engaged in the cavities 41A and 41B of the parts 13A and 13B. Thus, assembly is made extremely easy.

In the absence of any action by the driver on the steering-wheel 12, the parts 13A and 13B are maintained in the neutral position of rest by the torsion bar 45. The passages 30 and 31, 32 of the rotors 23A and 23B have a relative position such that hydraulic pressure provided by the pump 18 passes directly from the pressure orifice 26 to the return orifice 28. The device functions with an open centre and the jack 19 is not pressurised.

When the driver exerts action on the steering-wheel 12 to steer the wheels 16, the parts 13A and 13B are offset relative to one another in a direction determined by the direction in which the steering-wheel is turned, and the relative angular position of the two discs 23A and 23B changes from the neutral position of rest to a working position where the passages 30 have an increased overlap with either and passages 31 or 32 to cause the hydraulic pressure delivered by the pump 18 to pass from the pressure orifice 26 to the corresponding service orifice 35 or 36. The jack 19 thus acts in the desired steering direction.

In the event of failure of the power-assistance means 17, 18 the effect of turning the steering-wheel 12 is to absorb the limited relative angular displacement between the parts 13A and 13B which is defined by the plug 42 in the cavities 41A and 41B. The elastic resistance provided by the torsion bar 45 is first overcome and subsequently, there is formed a rigid connection via the plug 42 between the parts 13A and 13B, the faces 43, 44 which are of considerable extent abutting each other, so that the part 13B is caused to rotate by the part 13A, thus enabling the control means 10 to take over manually to ensure standby steering under direct control.

The simple and robust construction of the device according to the invention and is reduced bulk particularly in a radial direction will be appreciated. It will be noted that the plug 42 can be as long as desired on the inside of the cavities 41A and 41B, thus enabling the appropriate torque to be transmitted in the case of failure of the power-assistance.

It will also be noted that the coupling of the rotors 23A and 23B to the parts 13A and 13B by means of the thin toothed corrugated annular elements 48A, 48B ensures faultless centering, whilst enabling the rotor disc 23A, 23B to move axially and/or to swivel a few degrees on the inside of the distributor, thus compensating for the production tolerances and permitting excellent operation of the distributor.

Moreover, the sub-assemblies consisting of the parts 13A-48A-23A and 13B-48B-23B can be prefitted before the engagement of the plug 42 in the cavities 41A and 41B, thus permitting an easy assembly of the distributor 21.

Figure 7:
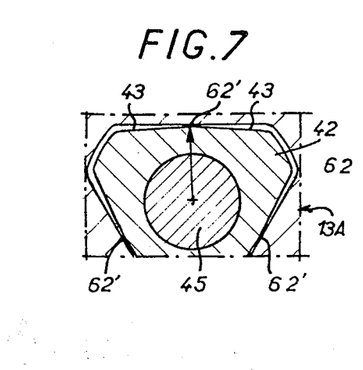
FIG. 7 is a view similar to that of FIG. 5, but showing a modification.

Alternatively (FIG. 7), the device is similar to that just described with reference to FIGS. 1 to 6, but the edge, designated by 62', of each dihedral convex face 43 of the plug 42 is rounded in a cylinder arc centered on the axis of the plug, so as to maintain the parts 13A and 13B centered relative to one another with excellent alignment.

Reference will now be made to FIGS. 8 to 11 which relate to another alternative form of power-assisted steering device according to the invention.

Figure 8:
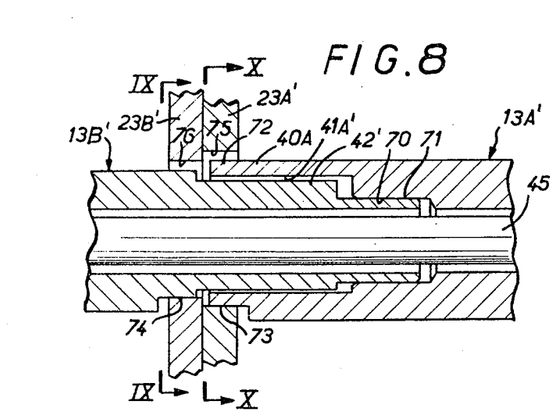
FIG. 8 is a partial diagrammatic view, in a longitudinal section, of an alternative form of a distributor and shows the two parts of the rotating transmission element, the plug, the cavity the centering means and the two rotors of the distributor.
Figures 11, 12:
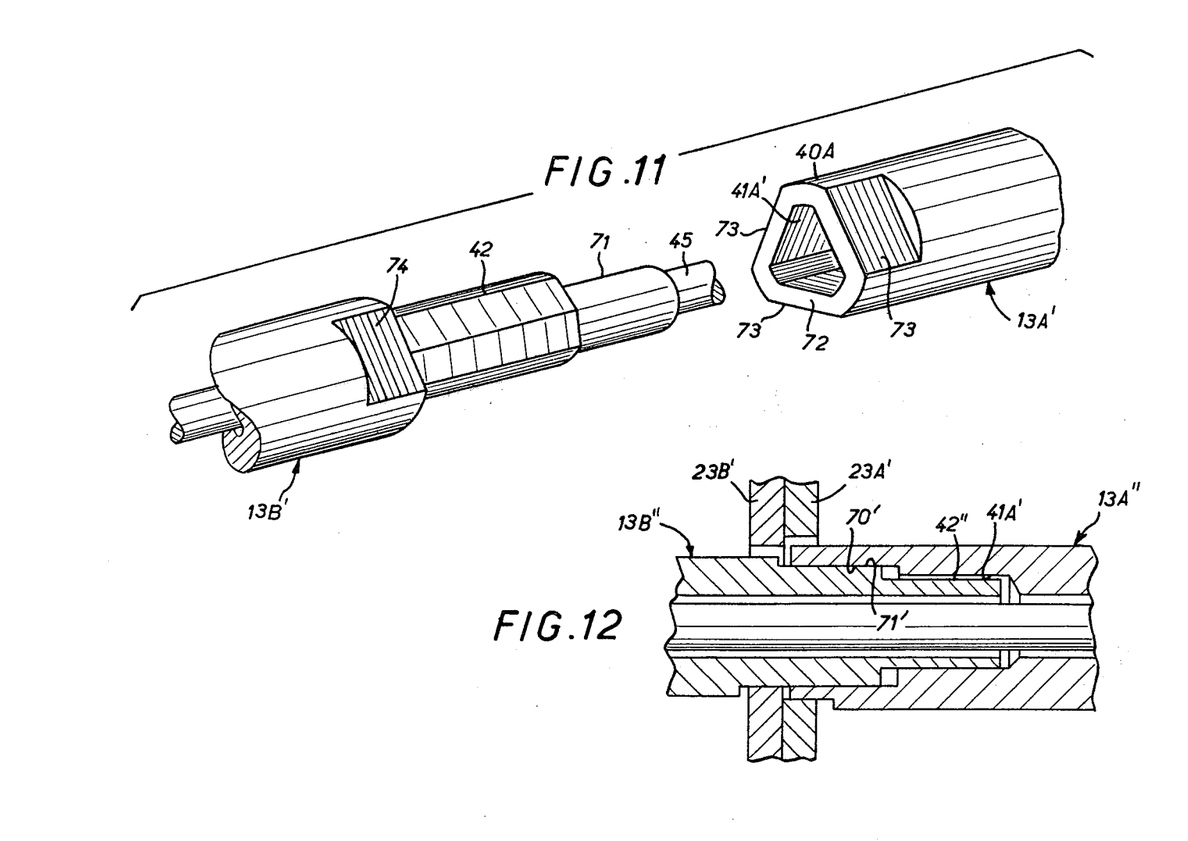
FIG. 11 is an exploded perspective view of part of the device shown in FIG. 8 to 10.
FIG. 12 is a view similar to FIG. 8, but showing a modified form of centering means for the two parts of the transmission element.

As in the foregoing, this device comprises control means acting on steering means. The control means have a rotatable transmission element, such as a steering column, which comprises two parts 13A' and 13B' (FIGS. 8 and 11). These parts 13A' and 13B' are coupled elastically by a torsion bar 45. A limited relative angular displacement is possible between the parts 13A' and 13B' under the action of the control means.

In response to such an angular displacement, assistance means are caused to act on the steering means in the same direction as the control means.

The part 13A' (FIGS. 8 to 11) has, at its end 40A adjacent to part 13B', a prism-shaped cavity 41A' in which is engaged a prism-shaped plug 42' which is formed in one piece with the part 13B'. The plug 42' has an angular deflection in the cavity 41A' so as to define said limited relative angular displacement between the parts 13A' and 13B'.

As in the foregoing, the power-assistance means comprise an hydraulic unit, an actuator acting on the steering means and a distributor located between the unit and the actuator and having (FIGS. 8 to 10) two rotors 23A' and 23B' rotating integrally respectively with the two parts 13A' and 13B'.

The parts 13A' and 13B' are centered relative to one another by two continuous cylindrical bearings 70 and 71 which are made respectively on the parts 13A' and 13B' adjacent the plug 42'.

In the example illustrated in FIGS. 8 to 11, the cylindrical bearing 70 of the part 13A' consists of a cylindrical recess located beyond the cavity 41A' in the direction going away from the end 40A of the part 13A', whilst the cylindrical bearing 71 of the part 13B' consists of a journal which is engaged in the recess 70 and which is located on the part 13B' beyond the plug 42' in the direction going towards the end of the part 13B'.

More particularly, the bearing 71 is located on the very end of the part 13B'. It will be understood that, under these conditions, the part 13B' has a cross-section decreasing progressively towards its end, thus permitting convenient manufacture and making it possible to have a plug of a larger size for the same external dimensions.

Figure 9:
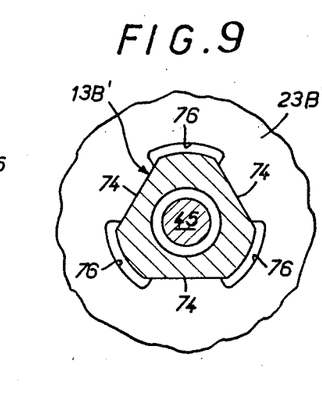
FIGS. 9 and 10 are corresponding views in cross-sections respectively along the line IX—IX and the line X—X of FIG. 8.

The part 13A' which has the cavity 41A' possesses, around this cavity 41A', a collar 72 of substantially constant thickness, with a prism-shaped outer profile 73 which is homothetic to that of the cavity 41A' and on which the rotor 23A' is engaged so as to rotate integrally therewith and so as to move freely in translation, along the guiding bearing faces 73.

The collar 72 can be manufactured, in a convenient way, from a cylindrical tubular end of the element 13A' which is flattened by means of radially acting tools, or else by extrusion using a tool having an axial action, or else by means of a machine which is both radially and axially acting.

Figure 10:
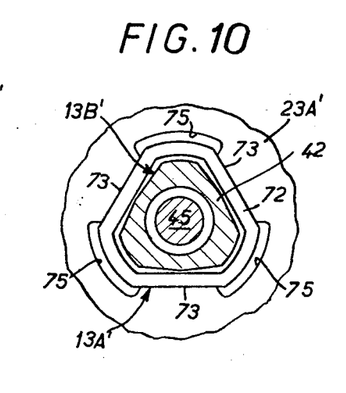

The part 13B' which is connected to the plug 42' receives the rotor 23B', which is engaged so as to rotate integrally therewith and so as to move freely in translation, on a prism-shaped guide bearing surface 74 made on the part 13B' adjacent the plug 42'.

Preferably, the rotor 23A' possesses apertures 75 which alternate with the guide bearing faces 73 to avoid jamming, and, in the same way, the rotor 23B' possesses apertures 76 which alternate with the guide bearing faces 74 (FIGS. 9 and 10). These apertures also ensure the passage of oil necessary for the distributor to operate.

Alternatively (FIG. 12), the arrangement is similar to that as described with reference to FIG. 8 to 11, but the cylindrical centering bearing, designated by 71', of the part 13B'' is no longer located at the very end of this part 13B'', and the part 13B'' is provided with the plug 42'' beyond the cylindrical centering bearing 71' in the direction going towards the end of the part 13B''. In the same way, the centering bearing recess 70' of the part 13A'' is located beyond the prism-shaped cavity 41A' in the direction going towards the end of the part 13A''.

Figure 13:
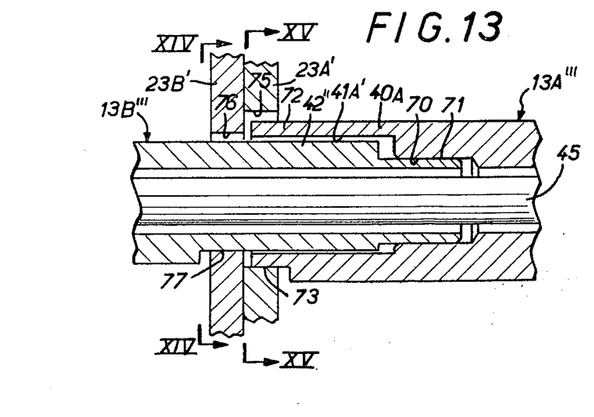
FIG. 13 is a view similar to FIG. 8, but in which one of the rotors is mounted directly on the plug.
Figure 14:
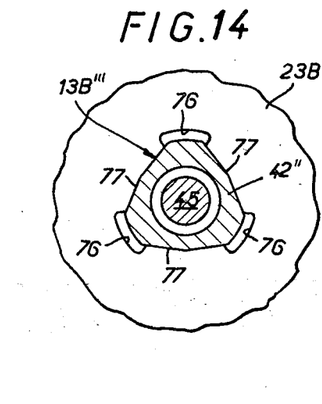
FIGS. 14 and 15 are corresponding views in cross-sections respectively along the line XIV—XIV and the line XV—XV of FIG. 13.
Figure 15:
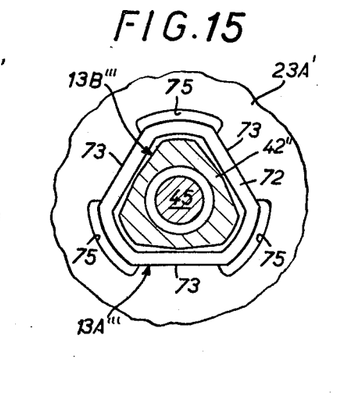

In another alternative form (FIGS. 13 to 15), the device is similar to that described with reference to FIGS. 1 to 4, but the part 13B''' connected to the plug 42 receives the rotor 23B' directly engaged at 77 on the plug 42'' so as to rotate integrally therewith and so as to move freely in translation. This makes it possible to simplify production by eliminating the prism-shaped surface 74.

We claim:

1. A power-assisted steering device for a vehicle, comprising
control means operable to act on steering means, said control means comprising a transmission element in two parts, at least one of said parts being provided with a prism-shaped cavity at its end adjacent the other of said parts, and a prism-shaped plug which is received in said cavity with an angular offset therebetween and is connected to the other of said two parts, the two parts being capable of a limited relative angular displacement which is determined by the said angular offset between the plug and the cavity; and
power-assistance means responsive to relative angular displacement of said two parts to act on said steering means in the same direction of force as the control means, said power-assistance means comprising a hydraulic unit, an actuator acting on the steering means, and a hydraulic distributor located between the hydraulic unit and the actuator, said hydraulic distributor comprising two rotors, each rotationally integral with a respective one of said two parts, and at least one thin annular element, at least one of the said parts being notched on the outside and the associated rotor being notched on the inside, said at least one annular element being toothed both internally and externally and being located between said at least one part and said rotor, the teeth of said element engaging the notches in both said part and said rotor, so that the part and its associated rotor are rotationally integral.

2. A power-assisted steering device according to claim 1, wherein the two parts and the two rotors are notched and a respective one of two thin toothed annular elements is located between each said part and its associated rotor.

3. A power-assisted steering device according to claim 1, wherein said thin toothed annular element is corrugated.

4. A power-assisted steering device according to claim 1, wherein the thin toothed annular element is adapted to be mounted on the end of the respective said part and on the associated said rotor, so as to form a preformed sub-assembly before the assembly of said plug into said cavity.

5. A power-assisted steering device for a vehicle, comprising control means operable to act on steering means, said control means comprising a transmission element in two parts, at least one of said parts being provided with a prism-shaped cavity at its end adjacent the other of said parts, and a prism-shaped plug which is received in said cavity with an angular offset therebetween and is connected to the other of said two parts, the two parts being capable of a limited relative angular displacement which is determined by the said angular offset between the plug and the cavity; and power-assistance means responsive to relative angular displacement of said two parts to act on said steering means in the same direction of force as the control means, said power-assistance means comprising a hydraulic unit, an actuator acting on the steering means, and a hydraulic distributor located between the hydraulic unit and the actuator, said hydraulic distributor comprising two rotors, each rotationally integral with a respective one of said two parts, said one of the parts which is provided with the prism-shaped cavity having, about the cavity, a collar of substantially constant thickness, with a prism-shaped outer profile which is similar to that of the cavity and on which the corresponding rotor is engaged so as to rotate integrally therewith and so as to move freely relative thereto in axial translation.

6. A power-assisted steering device according to claim 5, wherein two continuous cylindrical bearings are provided respectively on said parts adjacent said plug, the said bearings mutually interengaging to center the parts relative to each other.

7. A power-assisted steering device according to claim 6, wherein one of the parts is fastened to the plug and is provided with the cylindrical centering bearing beyond the plug in the direction towards the end of one part.

8. A power-assisted steering device according to claim 7, wherein said cylindrical centering bearing is located at the end of one part.

9. A power-assisted steering device according to claim 6, wherein one of the parts is fastened to the plug, the plug being disposed beyond the cylindrical centering bearing in the direction going towards the end of one part.

10. A power-assisted steering device according to claim 5, wherein one of the parts is fastened to the plug and receives the corresponding rotor on said plug and has surfaces engaging with the latter rotor to prevent relative rotation of the rotor while permitting the rotor to move freely in axial translation.

11. A power-assisted steering device according to claim 5, wherein one of the parts is fastened to the plug and receives a rotor and has surfaces engaging with the latter rotor to prevent relative rotation of the rotor while permitting the rotor to move freely in axial translation, on a prism-shaped surface of said part, adjacent said plug.

12. A power-assisted steering device according to claim 5, wherein one said part has said plug formed in one piece therewith.

* * * * *